United States Patent
Yoo et al.

(10) Patent No.: US 10,921,472 B2
(45) Date of Patent: Feb. 16, 2021

(54) DETERMINING FIRST-BREAK POINTS IN SEISMIC DATA

(71) Applicant: Saudi Arabian Oil Company, Dhahran (SA)

(72) Inventors: Jewoo Yoo, Delft (NL); Roald van Borselen, Voorschoten (NL)

(73) Assignee: Saudi Arabian Oil Company, Dhahran (SA)

( * ) Notice: Subject to any disclaimer, the term of this patent is extended or adjusted under 35 U.S.C. 154(b) by 353 days.

(21) Appl. No.: 15/928,323

(22) Filed: Mar. 22, 2018

(65) Prior Publication Data

US 2019/0293816 A1    Sep. 26, 2019

(51) Int. Cl.
| | | |
|---|---|---|
| *G01V 1/32* | (2006.01) | |
| *G01V 1/28* | (2006.01) | |
| *G01V 1/36* | (2006.01) | |

(52) U.S. Cl.
CPC .............. *G01V 1/32* (2013.01); *G01V 1/288* (2013.01); *G01V 1/36* (2013.01); *G01V 2210/41* (2013.01); *G01V 2210/53* (2013.01)

(58) Field of Classification Search
None
See application file for complete search history.

(56) References Cited

U.S. PATENT DOCUMENTS

| | | |
|---|---|---|
| 4,894,809 A | 1/1990 | Moeckel |
| 5,181,171 A | 1/1993 | McCormack et al. |
| 7,675,813 B2 | 3/2010 | Valero et al. |
| 2005/0128872 A1 | 6/2005 | Valero et al. |
| 2014/0219054 A1 | 8/2014 | Mousa et al. |

FOREIGN PATENT DOCUMENTS

CN    101551467    10/2009

OTHER PUBLICATIONS

Sandhann et al. (Geophysical Applications of Artificial Neural Networks and Fuzzy Logic, Springer-Science+Business Media, B.V., 2003) (Year: 2003).*

(Continued)

*Primary Examiner* — Roy Y Yi
(74) *Attorney, Agent, or Firm* — Fish & Richardson P.C.

(57) ABSTRACT

The present disclosure describes methods and systems, including computer-implemented methods, computer program products, and computer systems, for determining first-break (FB) points. One computer-implemented method includes: selecting, by a hardware processor, potential first-break (PFB) points based on seismic data obtained by plurality of seismic receivers in a geological location; determining, by the hardware processor, a first plurality of FB lines based on the PFB points; selecting, by the hardware processor, a first FB line among the plurality of FB lines; filtering, by the hardware processor, the PFB points based on the first FB line; determining, by the hardware processor, a second plurality of FB lines based on the filtered PFB points; selecting, by the hardware processor, a second FB line among the second plurality of FB lines; and determining, by the hardware processor, FB points based on the second FB line.

17 Claims, 9 Drawing Sheets

(56) References Cited

OTHER PUBLICATIONS

Zhu et al. (A Multi-Channel Approach for Automatic Microseismic Event Localization Using RANSAC-based Arrival Time Event Clustering (RATEC), Georgia Institute of Technology, 2017) (Year: 2017).*

Alghalandis et al. (The RANSAC Methof for Generating Fracture Networks from Micro-seismic Event Data, International Association for Mathematical Geosciences 2013) (Year: 2013).*

Coppens, "First arrival on common-offset trace collections for automatic estimation of static corrections," Geophysical Prospecting 33.8, Dec. 1985, 20 pages.

Denis and Cremoux, "Using the entropy of curves to segment a time or spatial series," Mathematical Geology 34.8, Nov. 2002, 16 pages.

Earle and Shearer, "Characterization of global seismograms using an automatic-picking algorithm," Bulletin of the Seismological Society of America 84.2, Apr. 1994, 11 pages.

Fischler and Bolles, "Random sample consensus: a paradigm for model fitting with applications to image analysis and automatic cartography," Communications of the ACM 24.6, Jun. 1981, 15 pages.

GeunSik et al., "RANSAC versus CS-RANSAC," AAAI, proceedings of the Twenty-Ninth AAAI Conference on Artificial Intelligence, Jan. 25-30, 2015, 7 pages.

Sabbione and Velis, "Automatic first-breaks picking: New strategies and algorithms," Geophysics 65.4, Jul.-Aug. 2010, 10 pages.

Wong et al., "Automatic time-picking of first arrivals on noisy microseismic data," CSEG 00.20.40.60.8, 1(1.2), 2009, 6 pages.

Withers et al., "A comparison of select trigger algorithms for automated global seismic phase and event detection," Bulletin of the Seismological Society of America 88.1, Feb. 1998, 13 pages.

International Search Report and Written Opinion issued in International Application No. PCT/US2019/022748 dated Jun. 13, 2019, 16 pages.

Wong, "Picking of first arrival times on very large scale seismic datasets," retrieved from URL <https://www.geoconventi on.com/archives/2016/O46_GC2016_Picking_of_First-Arrival_Timeson_Very_Large_Seismic_Datasets.pdf>, retrieved on Feb. 16, 2018, available on or before Aug. 11, 2016, 4 pages.

Guo et al., "A New Strategy of Automatic First Break Picking for Large Land Surveys," SEG/San Antonio 2007 Annual Meeting, Jun. 12, 2017, 5 pages.

GCC Examination Report in GCC Appln. No. GC 2019-37246, dated May 13, 2020, 4 pages.

* cited by examiner

DETERMING FIRST-BREAK POINTS IN SEISMIC DATA

TECHNICAL FIELD

This disclosure relates to exploration and production of hydrocarbons and, more specifically, to determining first-break points in seismic data collected by seismic receivers in a geological location.

BACKGROUND

In the context of seismic exploration, first-break (FB) picking refers to the task of determining the onsets of the first signal arrivals in a set of seismic traces. These onsets of the first signal arrivals are referred to as first-breaks (FBs). FB picking can also be referred to as first arrival picking, first break detection, or first break point determination. In a seismic exploration, seismic signals are transmitted into the subsurface of the earth, at a source location by a source device. Examples of the seismic signals include acoustic signals. The seismic signals travel through the subsurface and are received by a receiver device placed at a receiver location. In some cases, the source device, the receiver device, or a combination thereof can be placed at the surface. The signals can propagate downwards until they reach a reflecting structure and reflect upwards, towards the surface. Because the signals have refracted and reflected through the substructure, the characteristics of the received signals contain information of the substructure. The received signals can be recorded and analyzed to produce images of the subsurface structure. For one single shot, signal data received at one receiver device is recorded as a single seismic trace. A gather is a collection of seismic traces that share some common geometric attribute. For example, a common shot gather refers to the traces of the gather that are collected from a single shot and many receivers. A common receiver gather refers to the traces of the gather that are collected from a single receiver with many shots.

For example, in a marine survey, air guns and hydrophones can be used as the source devices and the receiver devices, respectively. During the acquisition, seismic sources are exploded from arrays of air guns. The reflected and refracted signals are acquired by streamers of hydrophones. In a land acquisition, dynamite can be used as an explosive source and a geophone is employed as a receiver device. In another example, vibratory trucks can be used as source devices. Other devices that generate and receive seismic signals can also be used.

SUMMARY

The present disclosure describes methods and systems, including computer-implemented methods, computer program products, and computer systems for determining first-break (FB) points. One computer-implemented method includes selecting, by a hardware processor, potential first-break (PFB) points based on seismic data obtained by plurality of seismic receivers in a geological location. The hardware processor generates a first plurality of FB lines based on the PFB points. The hardware processor selects a first FB line among the plurality of FB lines. The hardware processor filters the PFB points based on the first FB line. The hardware processor generates a second plurality of FB lines based on the filtered PFB points. The hardware processor selects a second FB line among the second plurality of FB lines. The hardware processor determines FB points based on the second FB line.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, cause the system to perform the actions. One or more computer programs can be configured to perform particular operations or actions by virtue of including instructions that, when executed by data processing apparatus, cause the apparatus to perform the actions.

The details of one or more implementations of the subject matter of this specification are set forth in the accompanying drawings and the subsequent description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following description is presented to enable any person skilled in the art to make and use the disclosed subject matter, and is provided in the context of one or more particular implementations. Various modifications to the disclosed implementations will be readily apparent to those skilled in the art, and the general principles defined in this disclosure may be applied to other implementations and applications without departing from scope of the disclosure. Thus, the present disclosure is not intended to be limited to the described or illustrated implementations, but is to be accorded the widest scope consistent with the principles and features disclosed in this disclosure.

This disclosure generally describes methods and systems, including computer-implemented methods, computer program products, and computer systems, for first-break (FB) picking. The occurrences of first breaks (FBs) in the seismic traces are dependent on the source type and the near-surface conditions. Therefore, FB points (also referred to as FB picks) generated by the FB picking process can indicate near-surface irregularities, differences in the elevation of shots and geophones, and other geological effects. Accordingly, FB points are used to determine static corrections. The static corrections are applied to remove static anomalies in developing subsurface geological models of a reservoir. The subsurface geological models are used to direct field operations. These field operations include drilling operations. An accurate subsurface geological model, generated based on accurate FB points, can save operation time and expenses in the drilling operations.

Figure 1:
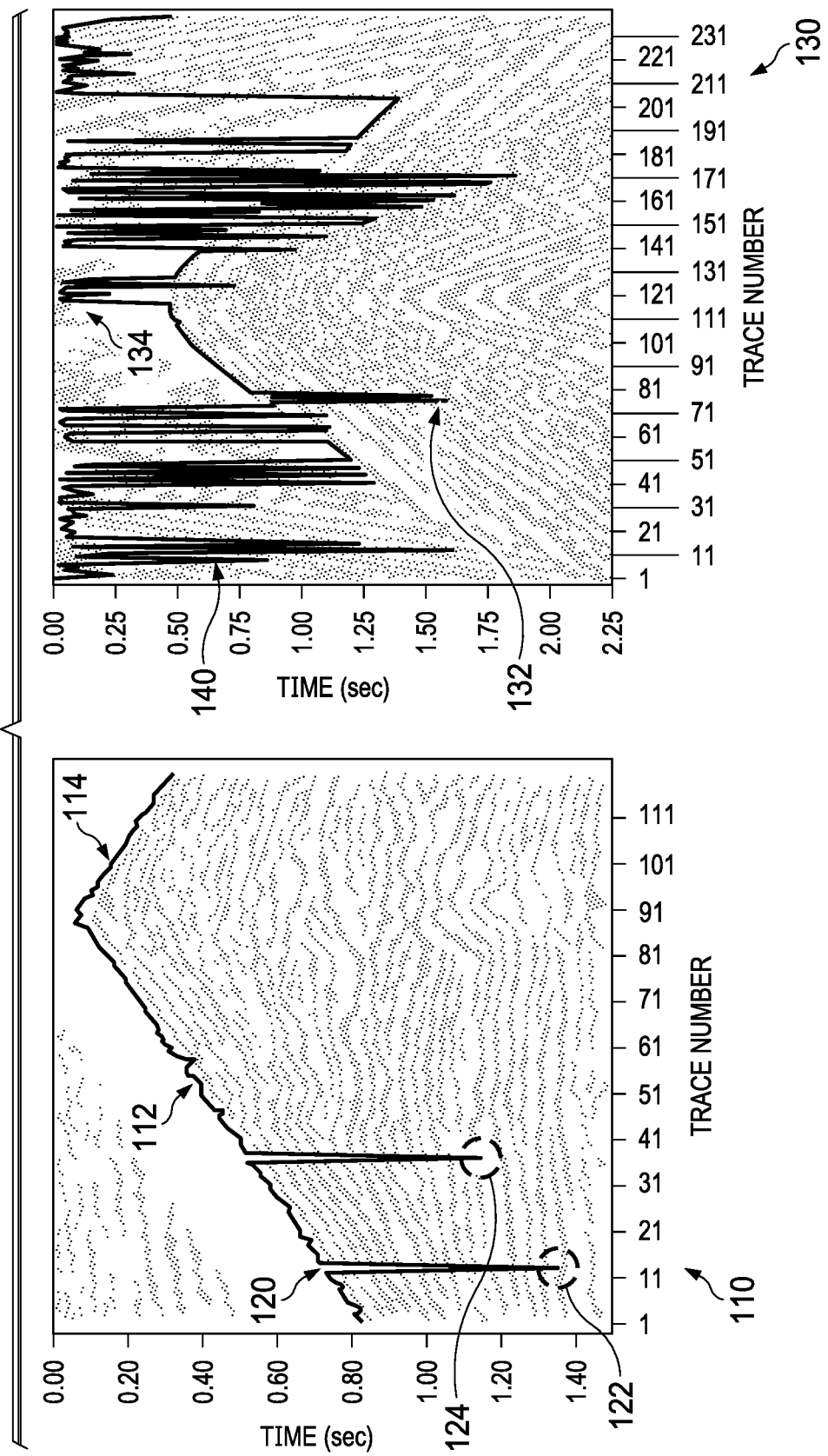
FIG. 1 includes schematic drawings of example shot gathers illustrating the 1-dimensional (1D) edge detection method, according to an implementation.

With the development of computer equipment and the increasing size of seismic surveys, autonomous FB picking algorithms can be implemented to perform FB picking. However, signal-to-noise ratio of the seismic data and the existence of indistinct first breaks can make autonomous FB picking algorithms difficult to implement. An example autonomous FB picking algorithm is a 1-dimensional (1D) edge detection method. Examples of 1D edge detection method include Modified Coppens's method (MCM), Entropy method (EM), Fractal dimension method (FDM), and Modified energy ratio method (MERM). In the 1D edge detection method, derivatives of attributes of the received signal data are computed. Example of the attributes can be entropy or energy ratio of the received signal data. For each trace of the received signal data, the maximum value of the derivate is found. The data point corresponding to the maximum value is selected as the FB picks. FIG. 1 includes schematic drawings of example shot gathers 110 and 130 illustrating the 1-dimensional (1D) edge detection method, according to an implementation. In these shot gathers, the y-axis represents time, in units of seconds. The x-axis represents signals from different traces, in units of sequence numbers. As shown in the shot gather 110, at each trace, a FB point corresponding to a maximum derivate of an entropy of the signal is selected. For example, a FB point 112 is selected for trace 51 and a FB point 114 is selected for trace 101. These FB points form a FB line 120. The FB line 120 generally represents the first arrival signal, with the exception of two errors. These two errors include a FB point 122 for trace 11 and a FB point 124 for trace 37. Including these two FB points produces an inaccurate FB line.

The number of errors increases if the data has low signal-to-noise ratio (SNR) (in one example, the SNR of data can be as low as −30 dB) or is acquired for subterranean structures having strong reflections. For example, the shot gather 130 is generated by processing a noisy dataset. As shown in the shot gather 130, a number of erroneous FB points, including FB points 132 and 134, are obtained using the 1D edge detection method. They form the FB line 140, which is does not represent the first arrival signal.

In some implementations, the edge detection method is combined with a random sample consensus (RANSAC) method to improve the FB picking process. In one example, a first plurality of FB lines is generated based on a plurality of potential FB (PFB) points. Among the first plurality of FB lines, a first FB line is selected based on the arrival time of the PFB points on the first FB line. The first FB line is used to filter the PFB points. The filtered PFB points are used to generate a second plurality of FB lines. A second FB line is selected among the second plurality of FB lines. FB points are determined based on the second FB line. This approach takes into account PFB points for the far offset region when strong noises and subsurface irregularities affect other PFB points. Therefore, this approach improves the accuracies of FB picking algorithms for datasets having low signal-to-noise ratio.

Figure 2:
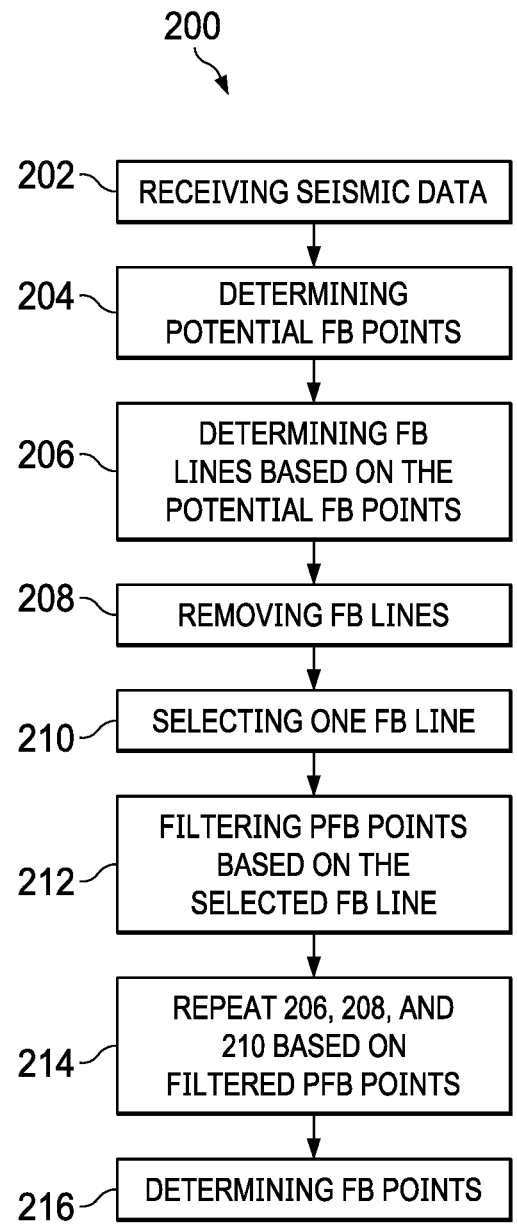
FIG. 2 illustrates an example of a method for first-break (FB) picking, according to an implementation.

FIG. 2 illustrates an example of a method 200 for first-break picking, according to an implementation. For clarity of presentation, the description that follows generally describes the method 200 in the context of FIGS. 1 and 3-10. However, it will be understood that method 200 may be performed, for example, by any other suitable system, environment, software, and hardware, or a combination of systems, environments, software, and hardware, as appropriate. In some implementations, various steps of method 200 can be run in parallel, in combination, in loops, or in any order.

At 202, the seismic data is received. As discussed previously, the seismic data can be collected in a seismic survey at a particular geological location. The particular geological location can be a reservoir or a potential reservoir. During a seismic survey, a source (dynamite, vibratory truck, air gun array) is activated. The reflections/refractions/transmissions from the subsurface geological boundaries are recorded by the receiver devices located on the surface of the Earth. This type of acquisition is repeated for each shot, sequentially or simultaneously, until all the seismic data have been acquired for this survey area. In some cases, the acquired seismic data are collected in the field, transferred to an office (stored and transported via a computer network, a physical network, or a combination thereof), and used as inputs to a computing device executing the method 200.

Figure 3:
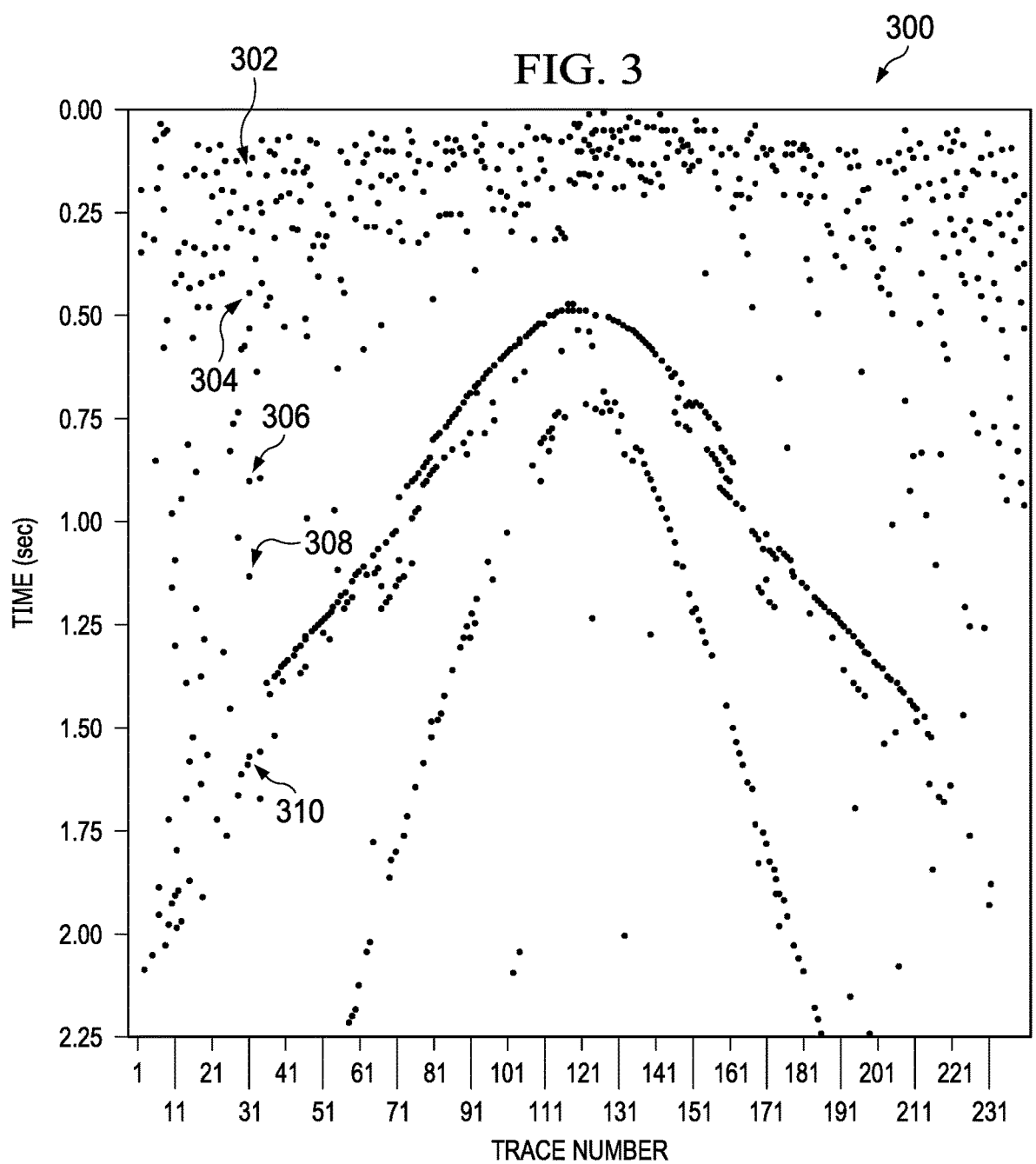
FIG. 3 is a schematic drawing of an example shot gather illustrating the determination of potential FB (PFB) points, according to an implementation.

At 204, potential FB (PFB) points are determined. The PFB points can be determined based on the derivate of attributes in each trace of the received signal data. However, instead of selecting only the point corresponding to the maximum derivative value in the trace (as discussed previously in the 1D edge detection method), more than one PFB points are selected. The PFBs can be determined through following expressions:

$$P(t) = \begin{cases} H(t), & \text{if } H(t) \geq c \\ 0 & \text{otherwise} \end{cases}$$

where c=LARGE(H(t),k), where P(t) presents the PFB points, H(t) represents the derivative of the computed seismic attributes. The function LARGE(a(x),b) is a function that returns the b-th largest value of a(x). k is a natural number parameter representing the number of PFB points per trace. k is less than the value of the time sampling. k can be configured. In one example, 5 PFB points are selected per trace. These 5 PFB points correspond to the 5 highest derivative values in that trace. FIG. 3 is a schematic drawing of an example shot gather 300 illustrating the determination of PFB points, according to an implementation. As shown in the shot gather 300, 5 PFB points 302, 304, 306, 308, and 310 are selected for trace 31.

Figure 4:
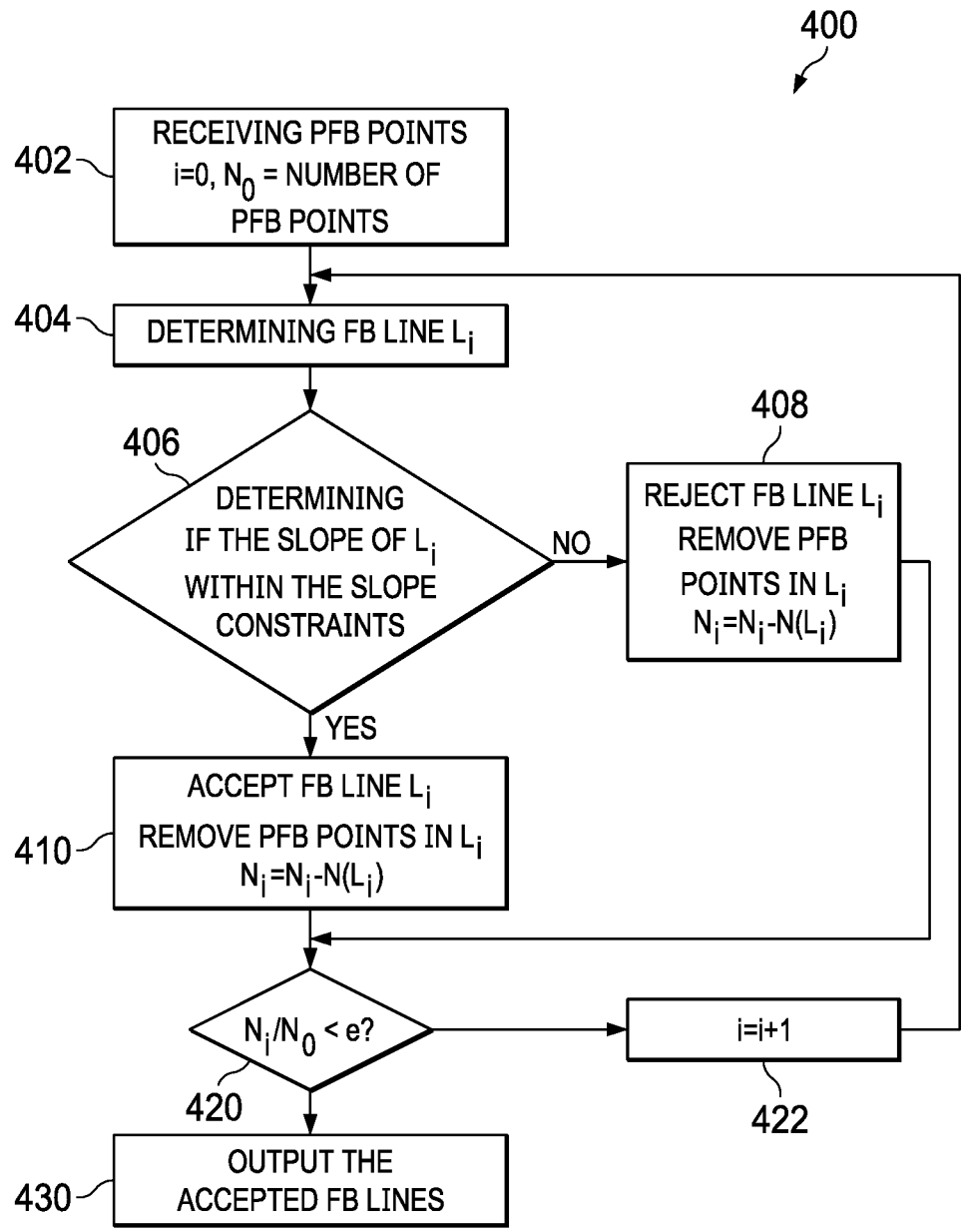
FIG. 4 illustrates an example of a process for determining the FB lines, according to an implementation.

At 206, FB lines are determined based on the PFB points. The FB lines are determined using a line regression algorithm. FIG. 4 illustrates an example of a process 400 for determining the FB lines, according to an implementation. At 402, PFB points are received. At the first iteration, the index of iteration i is set to 0. The number of PFB points in the PFB dataset is $n_0$. At 404, a FB line is determined based on the PFB points in the PFB dataset. Random sample consensus (RANSAC) algorithm is used to determine the FB line. In general, a RANSAC algorithm uses an iterative process to estimate parameters of a mathematical model from a set of observed data. The set of observed data may include outliers. The algorithm seeks to minimize or remove the influences of the outliers in its estimation. In the present example, RANSAC algorithm is used to find a line that matches best with a linear equation for all the PFB points in the current iteration. The linear equation is selected based on a target mathematical model of the subterranean structure. For example, the FB line can be represented by the linear equation below:

$$t = Ax + B$$

where t represents time, x represents the distance offset between a source and a receiver, and A and B are constant values that is computed by the RANSAC algorithm. At the first iteration, the FB line is represented as $l_0$.

At 406, the slope of the FB line is compared with slope constraints to determine whether the slope is within the slope constraints. The slope constraints can include a maximum slope constraint, a minimum slope constraint, or both. The maximum or minimum slope constraints are determined based on the velocity constraints of the subterranean structure. Because the arrival of first signals are limited by the velocity of the signal propagation in the subterranean structure, the maximum or minimum velocity of the signal propagation in the subterranean structure can be used to set the range of the slope for FB lines. If the slope of the FB line is greater than the maximum slope constraint or less than the minimum slope constraint, the FB line is inaccurate. Accordingly, if the slope of the FB line exceeds the range defined by these slope constraints, the process 400 proceeds from 406 to 408. At 408, the FB line is rejected. The PFB points on the FB line are removed from the PFB dataset. The number of remaining PFB points in the PFB dataset is reduced by the number of the PFB points on the FB lines. From 408, the process 400 proceeds to 420.

If the slope of the FB line is within the range of the slope constraints, the process 400 proceeds from 406 to 410. At 410, the FB line is accepted. The PFB points on the FB line are removed from the PFB dataset. The number of remaining PFB points in the PFB dataset is reduced by the number of the PFB points on the FB lines.

The process 400 proceeds from 410 to 420. At 420, the number of remaining PFB points in the PFB dataset is evaluated to determine whether the iteration should stop. If there are not enough PFB points left after multiple iterations of removal, the iteration should stop. In some implementations, the ratio between the number of remaining PFB points and the number of initial PFB points is calculated. If the ratio falls below a threshold, the iteration stops. In that case, the process 400 proceeds from 420 to 430. At 430, the accepted FB lines are outputted. If the ratio exceeds the threshold, the iteration continues. In some cases, the threshold can be set according to the signal-to-noise ratio of the seismic data. For example, the higher the signal-to-noise ratio of the seismic data, the higher value that the threshold can be configured to. In that case, the process 400 proceeds from 420 to 422. At 422, the index of iteration i is increased by 1. The process 400 proceeds from 422 to 404, where the next FB line is determined based on the remaining PFB points.

Returning to FIG. 2. At 208, FB lines are removed based on their corresponding PFB points. These FB lines computed by the process 400 have non-overlapping corresponding PFB points. The amplitude of each PFB point can be set to the derivative of the attribute for the PFB point. Examples of the attribute include entropy or energy ratio. Each FB line can be assigned a weight that is equal to the summation of the amplitudes of the PFB points on the FB line. A PFB point with a larger amplitude has a greater chance to be the correct FB point than a PFB point with a smaller amplitude. Likewise, an FB line with a larger weight has a greater chance to be a correct FB line than an FB line with a smaller weight. Therefore, the FB line with a weight that is smaller than a threshold is removed.

Figure 5:
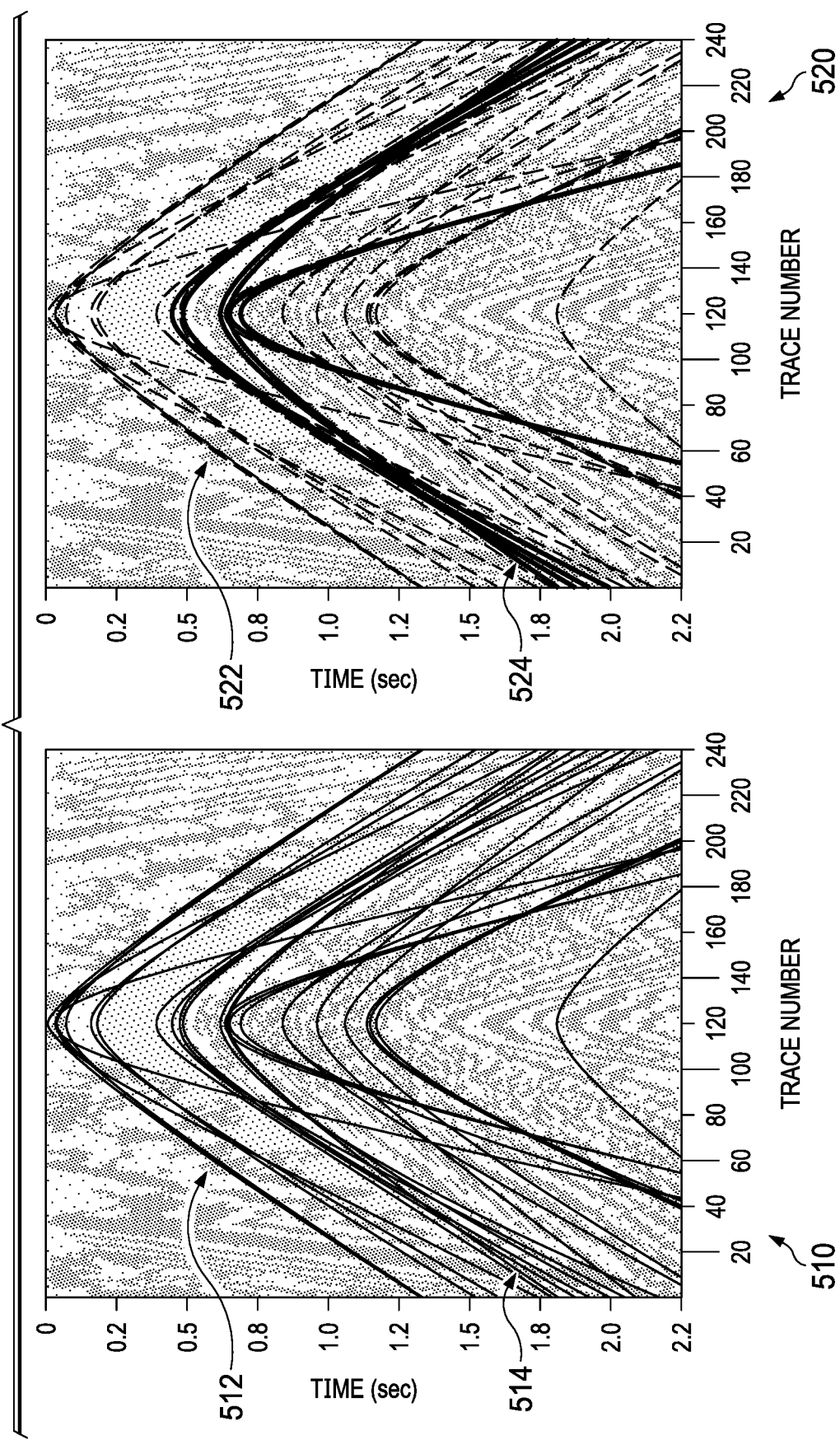
FIG. 5 includes schematic drawings of example shot gathers illustrating the removal of FB lines, according to an implementation.

FIG. 5 includes schematic drawings of example shot gathers 510 and 520 illustrating the removal of FB lines, according to an implementation. The shot gather 510 illustrates the FB lines determined by the line regression process before the removing process. These FB lines includes example FB lines 512 and 514. The shot gather 520 illustrates both the FB lines that are removed and the FB lines that are kept. The FB lines that are removed are drawn with dashed lines. The FB lines that are kept are drawn with solid lines. As illustrated, the example FB line 522 is removed. The example FB line 524 is kept.

Figure 6:
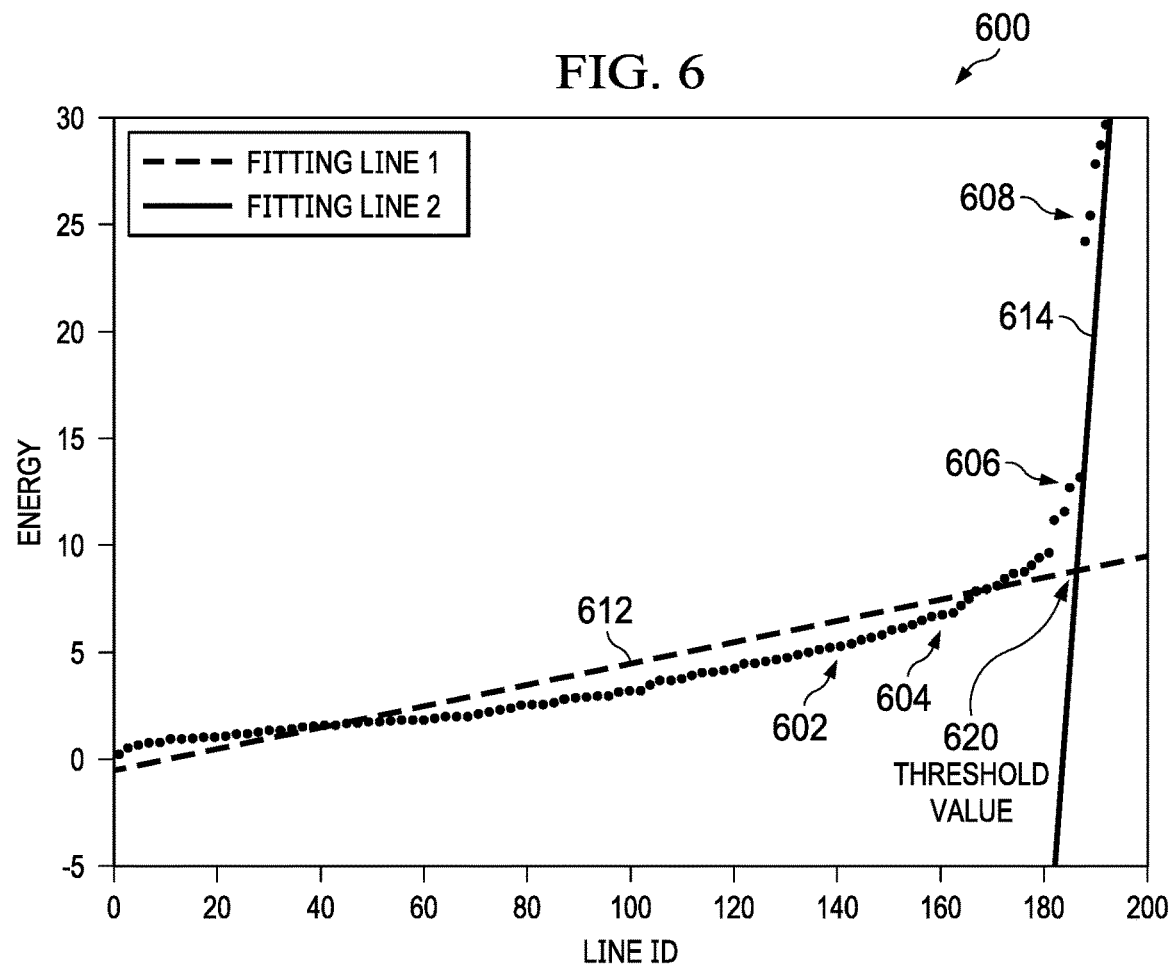
FIG. 6 is a schematic drawing illustrating the determination of a threshold for removing FB lines, according to an implementation.

The threshold value can be computed using a 2-line regression based on the energy of the PFB points of each line. FIG. 6 is a schematic drawing 600 illustrating the determination of a threshold for removing FB lines, according to an implementation. The drawings 600 includes FB line points (for example, points 602, 604, 606, 608) as illustrated. Each FB line point represents one FB line. The x-axis value of the FB line point represents the line identifiers (ID) for the FB line. The y-axis value of the FB line point represents the weight of the FB line as discussed previously, which corresponds to the energy of the FB line. In the illustrated example, 2-line regression algorithm is used to compute two fitting lines 612 and 614 based on these FB line points. Based on the FB line points, two fitting lines 612 and 614 can be computed using RANSAC algorithms. A threshold 620 can be obtained at the crossing point of these two fitting lines. Returning to FIG. 2, at 210, one FB line is selected from the remaining FB lines. The selection is based on the arrival time. The FB line that includes the PFB points representing the earliest time is selected. At 212, the PFB points are filtered based on the selected FB line. The PFB points graphically below the selected FB lines are kept, while the PFB points graphically above the selected FB lines are discarded. At 214, using the kept PFB points as the PFB dataset, steps 206, 208 and 210 are repeated to produce a second FB line.

Figure 7:
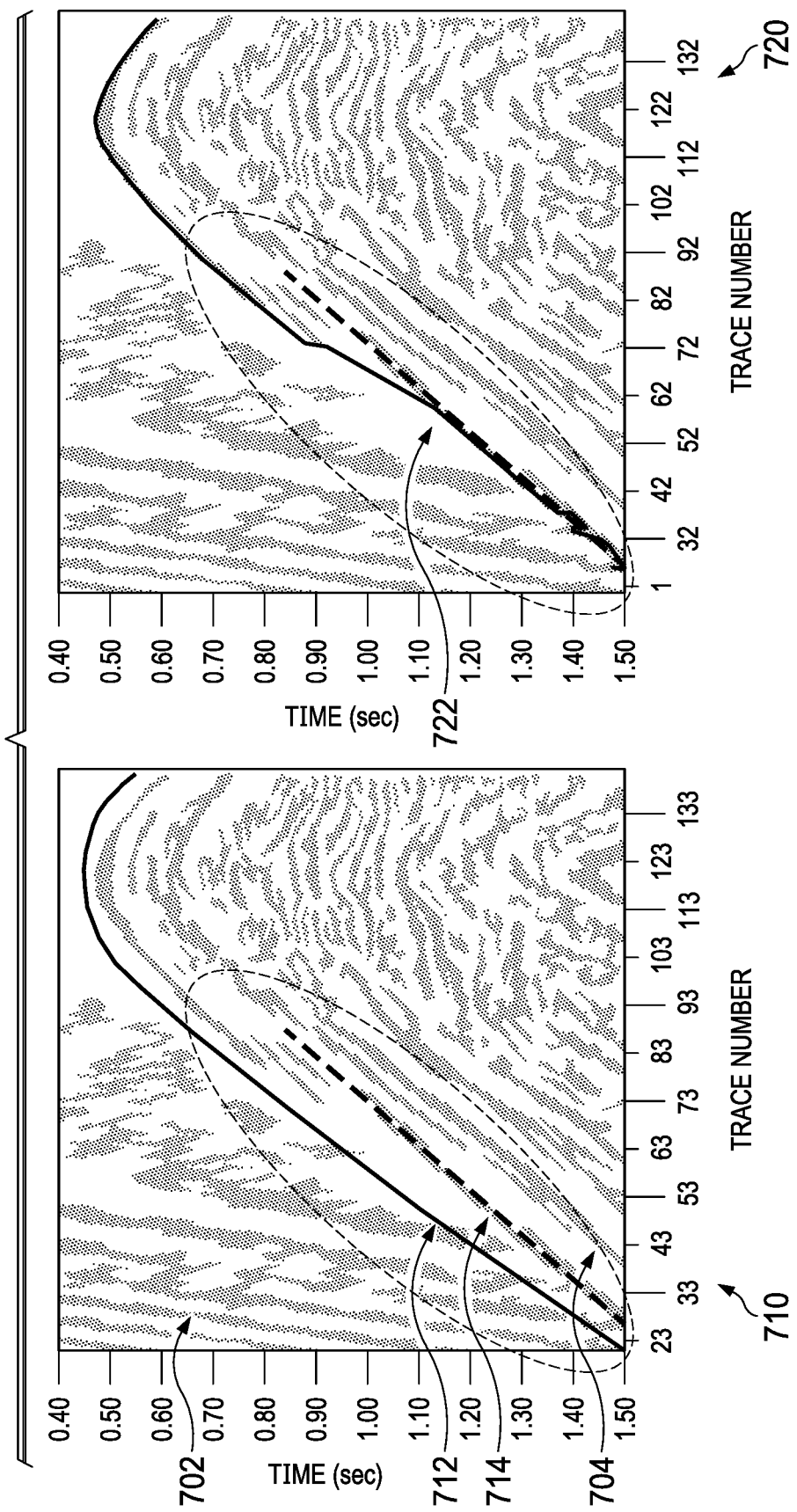
FIG. 7 includes schematic drawings of example shot gathers illustrating the generation of the second FB line, according to an implementation.

FIG. 7 includes schematic drawings of example shot gathers 710 and 720 illustrating the generation of the second FB line, according to an implementation. The shot gather 710 shows the FB lines 712 and 714 outputted at step 208. The FB line 712 is selected because it is graphically above the FB line 714, which indicates that the PFB points on the FB line 712 have an earlier arrival time than the PFB points on the FB line 714. At step 212, PFB points graphically above the FB line 712, for example PFB point 702, are removed. PFB points graphically below the FB line 712, for example PFB point 704, are kept. The shot gather 720 shows the FB line 722 after processing the kept PFB points. The FB line 722 combines the characteristics of both the FB lines 712 and 714. Therefore, the FB line 722 represents accurate FB of the subterranean structure.

Figure 8:
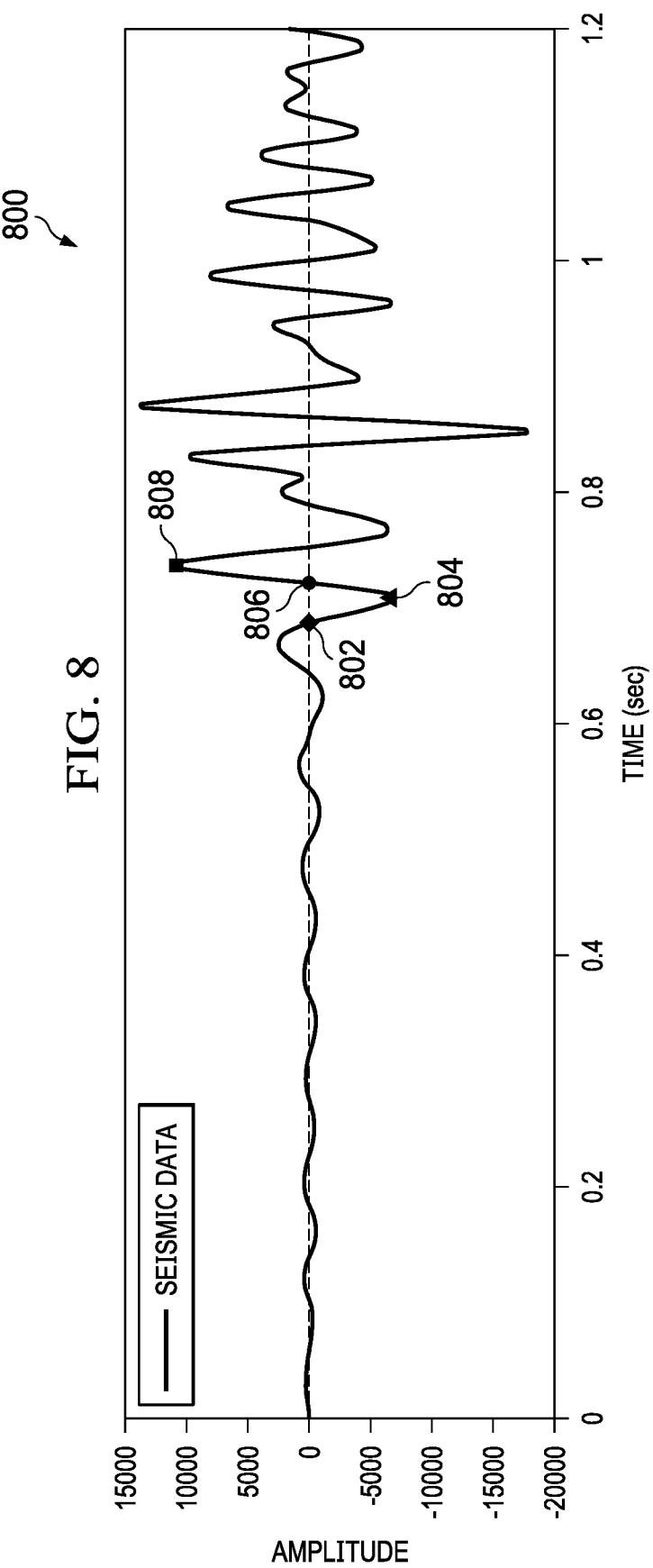
FIG. 8 is a schematic drawing of a wave propagated in a subterranean structure, according to an implementation.

Returning to FIG. 2, at 216, FB points are determined based on the second FB line. The FB points can be determined using a fitting algorithm based on interested seismic attributes. The following equations provide an example:

$$R(x) = \arg\min(|f(x) + t_d - A(x,t)|), \text{ when } A(x,t) \neq 0$$

$$A(x,t) = \begin{cases} t, & \text{if } u(x,t) \text{ is the interested seismic attribute} \\ 0 & \text{otherwise} \end{cases}$$

$$t_d = \arg\min(d_x(\tau))$$

$$d_x(\tau) = \int_{x-l}^{x+l} |f(x) + \tau - A(x,t)| dx, \text{ when } A(x,t) \neq 0$$

where R(x) represent the determined FB points, x represents the distance, t represents the arrival time, u(x,t) represents the input seismic dataset, A(x,t) represents the interested seismic attribute for the first break fitting, f(x) represents the second FB line, τ is the shifting parameter in time axis, $d_x(\tau)$ represents the difference between time shifted FB line "f(x)+τ" and interested seismic attribute "A(x,t)" computed in range from x−l to x+l, and l represents a natural value parameter for keeping the continuity of FB picks in local window. In some cases, l can take a value between 3 and 5. l can also be set to a value that is larger than 5, which may increase the probability of obtaining a continuous result, but also increase the computation time. In this example, the interested seismic attribute is a local maximum point of the propagation wave. Other seismic attributes can also be used. Examples of the seismic attributes include minimum point, earliest point of positive wave, earliest point of negative wave. FIG. 8 is a schematic drawing 800 of a wave propagated in a subterranean structure, according to an implementation. The x-axis shows the amplitude of the wave. The y-axis shows the propagation time of the wave. The points 802, 804, 806, and 808 represent the earliest point of negative wave, the local minimum of the wave, the earliest point of positive wave, and the local maximum of the wave, respectively.

As discussed previously, the determined FB points can indicate near-surface irregularities, differences in the elevation of shots and geophones. Accordingly, the determined FB points are in developing subsurface geological models. The geological models are used to direct drilling operations. An accurate subsurface geological model, generated based on accurate FB points, can save operation time and expenses in the drilling operations.

Figure 9:
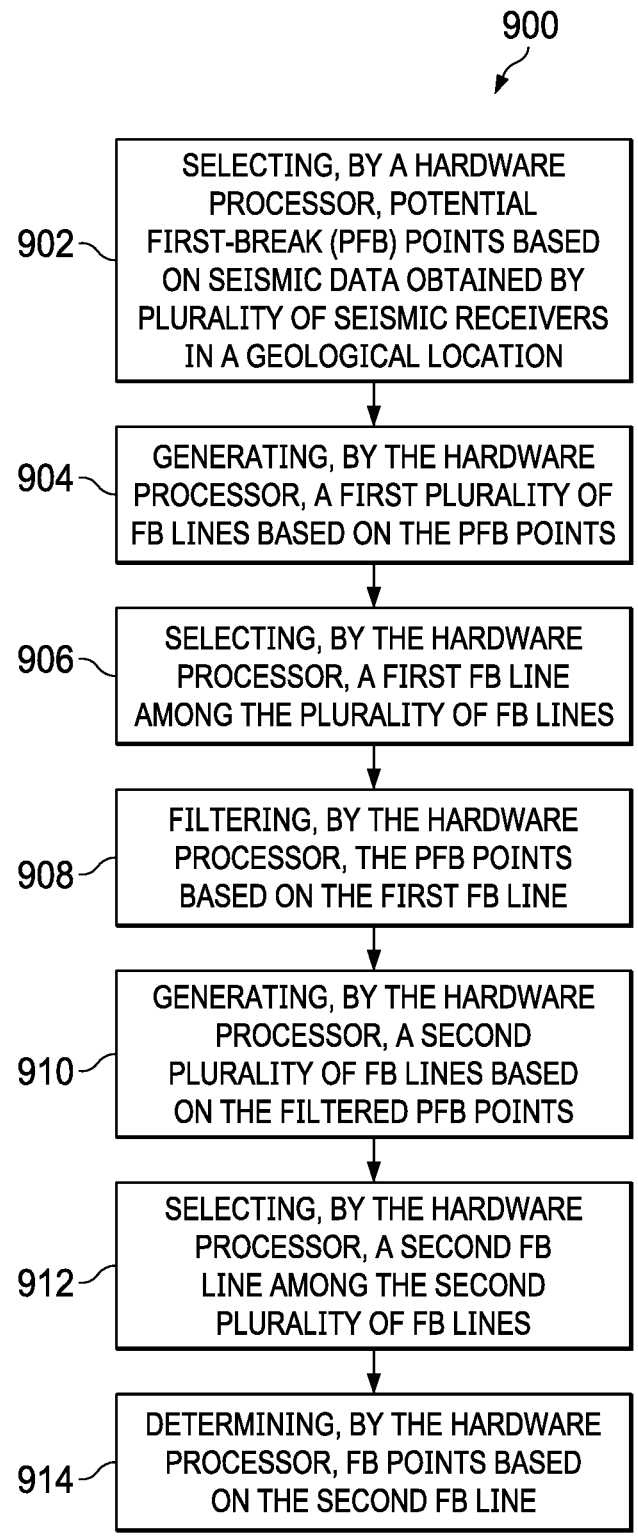
FIG. 9 illustrates an example FB picking method, according to an implementation.

FIG. 9 illustrates an example FB picking method 900, according to an implementation. For clarity of presentation, the description that follows generally describes method 900 in the context of FIGS. 1-8 and 10. However, it will be understood that method 900 may be performed, for example, by any other suitable system, environment, software, and hardware, or a combination of systems, environments, software, and hardware, as appropriate. In some cases, the method 900 can be executed on a large scale computer cluster, super computers, or any other computing device or collection of computing devices. In some implementations, various steps of method 900 can be run in parallel, in combination, in loops, or in any order.

At 902, potential first-break (PFB) points are selected by a hardware processor based on seismic data obtained by plurality of seismic receivers in a geological location. At 904, a first plurality of FB lines is generated by the hardware processor based on the PFB points. At 906, a first FB line is selected by the hardware processor among the plurality of FB lines. At 908, the PFB points are filtered by the hardware processor based on the first FB line. At 910, a second plurality of FB lines are generated by the hardware processor based on the filtered PFB points. At 912, a second FB line is selected by the hardware processor among the second plurality of FB lines. At 914, FB points are determined by the hardware processor based on the second FB line.

Figure 10:
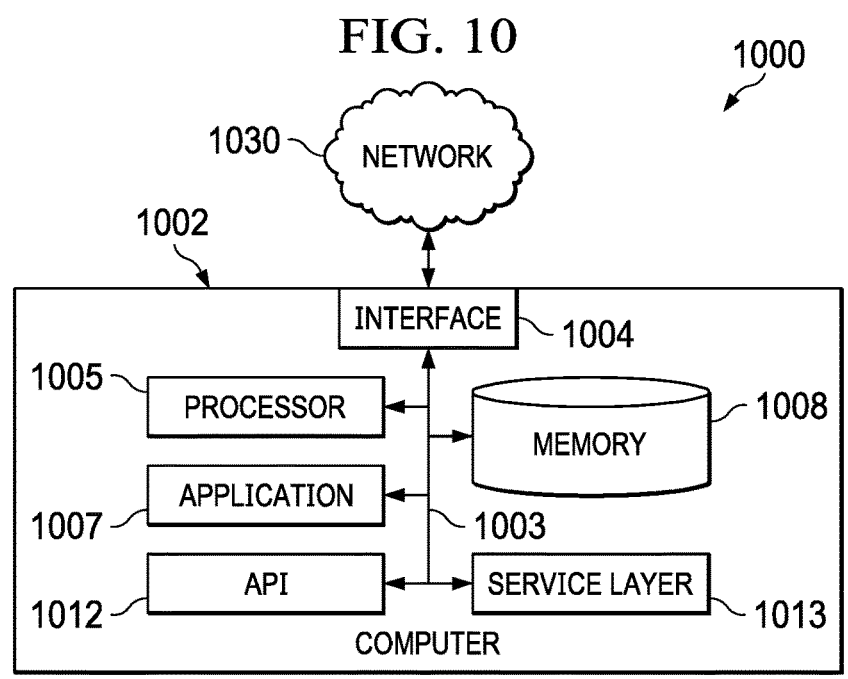
FIG. 10 is a high level architecture block diagram of an FB picking system, according to an implementation.

FIG. 10 is a high level architecture block diagram of a FB picking system 1000 based on the methods described in this disclosure, according to an implementation. At a high level, the illustrated system 1000 includes a computer 1002 coupled with a network 1030.

The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 1030 facilitates communication between the computer 1002 and other components, for example, components that obtain observed data for a location and transmit the observed data to the computer 1002. The network 1030 can be a wireless or a wireline network. The network 1030 can also be a memory pipe, a hardware connection, or any internal or external communication paths between the components.

The computer 1002 includes a computing system configured to perform the method as described in this disclosure. In some cases, the method can be implemented in an executable computing code, for example, C/C++ executable codes. In some cases, the computer 1002 can include a standalone LINUX system that runs batch applications. In some cases, the computer 1002 can include mobile or personal computers.

The computer 1002 may comprise a computer that includes an input device, such as a keypad, keyboard, touch screen, microphone, speech recognition device, other devices that can accept user information, or an output device that conveys information associated with the operation of the computer 1002, including digital data, visual or audio information, or a graphic user interface (GUI).

The computer 1002 can serve as a client, network component, a server, a database, or other persistency, or any other component of the system 1000. In some implementations, one or more components of the computer 1002 may be configured to operate within a cloud-computing-based environment.

At a high level, the computer 1002 is an electronic computing device operable to receive, transmit, process, store, or manage data and information associated with the system 1000. According to some implementations, the computer 1002 may also include, or be communicably coupled with, an application server, e-mail server, web server, caching server, streaming data server, business intelligence (BI) server, or other server.

The computer 1002 can receive requests over network 1030 from a client application (for example, executing on another computer 1002) and respond to the received requests by processing said requests in an appropriate software application. In addition, requests may also be sent to the computer 1002 from internal users (for example, from a command console), external or third parties, or other automated applications.

Each of the components of the computer 1002 can communicate using a system bus 1003. In some implementations, any or all the components of the computer 1002, both hardware or software, may interface with each other or the interface 1004, over the system bus 1003, using an application programming interface (API) 1012 or a service layer 1013. The API 1012 may include specifications for routines, data structures, and object classes. The API 1012 may be either computer language-independent or -dependent and refer to a complete interface, a single function, or even a set of APIs. The service layer 1013 provides software services to the computer 1002 or the system 1000. The functionality of the computer 1002 may be accessible for all service consumers using this service layer. Software services, such as those provided by the service layer 1013, provide reusable, defined business functionalities, through a defined interface. For example, the interface may be software written in JAVA, C++, or suitable language providing data in Extensible Markup Language (XML) format. While illustrated as an integrated component of the computer 1002, alternative implementations may illustrate the API 1012 or the service layer 1013 as stand-alone components in relation to other components of the computer 1002 or the system 1000. Moreover, any or all parts of the API 1012 or the service layer 1013 may be implemented as sub-modules of another software module, enterprise application, or hardware module, without departing from the scope of this disclosure.

The computer 1002 includes an interface 1004. Although illustrated as a single interface 1004 in FIG. 10, two or more interfaces 1004 may be used according to particular needs, desires, or particular implementations of the computer 1002 or system 1000. The interface 1004 is used by the computer 1002 for communicating with other systems in a distributed environment—including within the system 1000—connected to the network 1030 (whether illustrated or not). Generally, the interface 1004 comprises logic encoded in software or hardware in a suitable combination and operable to communicate with the network 1030. More specifically, the interface 1004 may comprise software supporting one or more communication protocols associated with communications such that the network 1030 or interface's hardware is operable to communicate physical signals within and outside of the illustrated system 1000.

The computer 1002 includes a processor 1005. Although illustrated as a single processor 1005 in FIG. 10, two or more processors may be used according to particular needs, desires, or particular implementations of the computer 1002 or the system 1000. Generally, the processor 1005 executes instructions and manipulates data to perform the operations of the computer 1002. Specifically, the processor 1005 executes the functionality required for processing geophysical data.

The computer 1002 also includes a memory 1008 that holds data for the computer 1002 or other components of the system 1000. Although illustrated as a single memory 1008 in FIG. 10, two or more memories may be used according to particular needs, desires, or particular implementations of the computer 1002 or the system 1000. While memory 1008 is illustrated as an integral component of the computer 1002, in alternative implementations, memory 1008 can be external to the computer 1002 or the system 1000.

The application 1007 is a software engine providing functionality according to particular needs, desires, or particular implementations of the computer 1002 or the system 1000, particularly with respect to functionality required for processing geophysical data. For example, application 1007 can serve as one or more components or applications described in FIGS. 1-9. Further, although illustrated as a single application 1007, the application 1007 may be implemented as multiple applications 1007, on the computer 1002. In addition, although illustrated as integral to the computer 1002, in alternative implementations, the application 1007 can be external to the computer 1002 or the system 1000.

There may be any number of computers 1002 associated with, or external to, the system 1000 and communicating over network 1030. Further, the terms "client," "user," and other appropriate terminology may be used interchangeably, as appropriate, without departing from the scope of this disclosure. Moreover, this disclosure contemplates that many users may use one computer 1002, or that one user may use multiple computers 1002.

In some implementations, the described methodology can be configured to send messages, instructions, or other communications to a computer-implemented controller, database, or other computer-implemented system to dynamically initiate control of, control, or cause another computer-implemented system to perform a computer-implemented operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, activate/deactivate a computing system, cause a network interface device to disable, throttle, or increase data bandwidth allowed across a network connection, or sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementations, the output of the described methodology can be used to dynamically influence, direct, control, influence, or manage tangible, real-world equipment related to hydrocarbon production, analysis, and recovery or for other purposes consistent with this disclosure. For example, data relating to processed seismic data can be used to enhance quality of produced seismic/structural images or for use in other analytical/predictive processes. As another example, the data relating to processed seismic data can be used to modify a wellbore trajectory, increase/decrease speed of or stop/start a hydrocarbon drill; activate/deactivate an alarm (such as, a visual, auditory, or voice alarm), or to affect refinery or pumping operations (for example, stop, restart, accelerate, or reduce). Other examples can include alerting geo-steering and directional drilling staff when underground obstacles have been detected (such as, with a visual, auditory, or voice alarm). In some implementations, the described methodology can be integrated as part of a dynamic computer-implemented control system to control, influence, or use with any hydrocarbon-related or other tangible, real-world equipment consistent with this disclosure.

Described implementations of the subject matter can include one or more features, alone or in combination.

For example, in a first implementation, a computer-implemented method for determining first-break (FB) points includes selecting, by a hardware processor, potential first-break (PFB) points based on seismic data obtained by plurality of seismic receivers in a geological location. The hardware processor generates a first plurality of FB lines based on the PFB points. The hardware processor selects a first FB line among the plurality of FB lines. The hardware processor filters the PFB points based on the first FB line. The hardware processor generates a second plurality of FB lines based on the filtered PFB points. The hardware processor selects a second FB line among the second plurality of FB lines. The hardware processor determines FB points based on the second FB line.

The foregoing and other implementations can each, optionally, include one or more of the following features, alone or in combination:

A first aspect, combinable with the general implementation, where the seismic data comprises a plurality of traces, and a plurality of PFB points are selected for each trace of seismic data.

A second aspect, combinable with any of the previous or following aspects, where the first plurality of FB lines is generated by using a line regression algorithm.

A third aspect, combinable with any of the previous or following aspects, where the first plurality of FB lines is generated based on slopes of the FB lines.

A fourth aspect, combinable with any of the previous or following aspects, where the first plurality of FB lines is generated based on energies of PFB points of the FB lines.

A fifth aspect, combinable with any of the previous or following aspects, where the PFB points are filtered by comparing arrival times of the PFB points with the first FB line.

A sixth aspect, combinable with any of the previous aspects, where the FB points are determined based on at least one seismic attribute, where the at least one seismic attribute comprises an earliest point of a negative seismic signal wave, a local minimum of a seismic signal wave, an earliest point of a positive seismic signal wave, and a local maximum of the seismic signal wave.

In a second implementation, a non-transitory computer-readable medium storing instructions which, when executed, cause a computer to perform operations comprising: selecting, by a hardware processor, potential first-break (PFB) points based on seismic data obtained by plurality of seismic receivers in a geological location. The hardware processor generates a first plurality of FB lines based on the PFB points. The hardware processor selects a first FB line among the plurality of FB lines. The hardware processor filters the PFB points based on the first FB line. The hardware processor generates a second plurality of FB lines based on the filtered PFB points. The hardware processor selects a second FB line among the second plurality of FB lines. The hardware processor determines FB points based on the second FB line.

The foregoing and other implementations can each, optionally, include one or more of the following features, alone or in combination:

A first aspect, combinable with the general implementation, where the seismic data comprises a plurality of traces, and a plurality of PFB points are selected for each trace of seismic data.

A second aspect, combinable with any of the previous or following aspects, where the first plurality of FB lines is generated by using a line regression algorithm.

A third aspect, combinable with any of the previous or following aspects, where the first plurality of FB lines is generated based on slopes of the FB lines.

A fourth aspect, combinable with any of the previous or following aspects, where the first plurality of FB lines is generated based on energies of PFB points of the FB lines.

A fifth aspect, combinable with any of the previous or following aspects, where the PFB points are filtered by comparing arrival times of the PFB points with the first FB line.

A sixth aspect, combinable with any of the previous aspects, where the FB points are determined based on at least one seismic attribute, wherein the at least one seismic attribute comprises an earliest point of a negative seismic signal wave, a local minimum of a seismic signal wave, an earliest point of a positive seismic signal wave, and a local maximum of the seismic signal wave.

In a third implementation, a device comprising: at least one hardware processor; and a non-transitory computer-readable storage medium coupled to the at least one hardware processor and storing programming instructions for execution by the at least one hardware processor, where the programming instructions, when executed, cause the at least one hardware processor to perform operations comprising: selecting potential first-break (PFB) points based on seismic data obtained by plurality of seismic receivers in a geological location. The hardware processor generates a first plurality of FB lines based on the PFB points. The hardware processor selects a first FB line among the plurality of FB lines. The hardware processor filters the PFB points based on the first FB line. The hardware processor generates a second plurality of FB lines based on the filtered PFB points. The hardware processor selects a second FB line among the second plurality of FB lines. The hardware processor determines FB points based on the second FB line.

The foregoing and other implementations can each, optionally, include one or more of the following features, alone or in combination:

A first aspect, combinable with the general implementation, where the seismic data comprises a plurality of traces, and a plurality of PFB points are selected for each trace of seismic data.

A second aspect, combinable with any of the previous or following aspects, where the first plurality of FB lines is generated by using a line regression algorithm.

A third aspect, combinable with any of the previous or following aspects, where the first plurality of FB lines is generated based on slopes of the FB lines.

A fourth aspect, combinable with any of the previous or following aspects, where the first plurality of FB lines is generated based on energies of PFB points of the FB lines.

A fifth aspect, combinable with any of the previous or following aspects, where the PFB points are filtered by comparing arrival times of the PFB points with the first FB line.

A sixth aspect, combinable with any of the previous aspects, where the FB points are determined based on at least one seismic attribute, wherein the at least one seismic attribute comprises an earliest point of a negative seismic signal wave, a local minimum of a seismic signal wave, an earliest point of a positive seismic signal wave, and a local maximum of the seismic signal wave.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), a FPGA (field programmable gate array), or an ASIC (application-specific integrated circuit). In some implementations, the data processing apparatus or special purpose logic circuitry may be hardware-based or software-based. The apparatus can optionally include code that creates an execution environment for computer programs, for example, code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, or IOS.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business or dynamic information, and any other appropriate information including any parameters, variables, algorithms, instructions, rules, constraints, or references thereto. Additionally, the memory may include any other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity or a multi-touch screen using capacitive or electric sensing. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication, for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20, and all or a portion of the Internet. The network may communicate with, for example, Internet Protocol (IP) packets, Frame Relay frames, Asynchronous Transfer Mode (ATM) cells, voice, video, data, or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software, may interface with each other or the interface using an application programming interface (API) or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API or service layer may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any disclosure or on the scope of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation or integration of various system modules and components in the implementations described previously should not be understood as requiring such separation or integration in all implementations, and it should be understood that the described program components and systems can generally be integrated together in a single software product or packaged into multiple software products.

Accordingly, the previous description of example implementations does not define or constrain this disclosure. Other changes, substitutions, and alterations are also possible without departing from the spirit and scope of this disclosure.

What is claimed is:

1. A computer-implemented method for determining first-break (FB) points, comprising:
    selecting, by a hardware processor, potential first-break (PFB) points based on seismic data obtained by plurality of seismic receivers in a geological location;
    generating, by the hardware processor, a first plurality of FB lines based on the PFB points, wherein the each of the first plurality of FB lines is determined by using a random sample consensus (RANSAC) algorithm;
    selecting, by the hardware processor, a first FB line among the plurality of FB lines;
    filtering, by the hardware processor, the PFB points based on the first FB line;
    generating, by the hardware processor, a second plurality of FB lines based on the filtered PFB points;
    selecting, by the hardware processor, a second FB line among the second plurality of FB lines; and
    determining, by the hardware processor, FB points based on the second FB line.

2. The method of claim 1, wherein the seismic data comprises a plurality of traces, and a plurality of PFB points are selected for each trace of seismic data.

3. The method of claim 1, wherein the first plurality of FB lines is generated based on slopes of the FB lines.

4. The method of claim 1, wherein the first plurality of FB lines is generated based on energies of PFB points of the FB lines.

5. The method of claim 1, wherein the PFB points are filtered by comparing arrival times of the PFB points with the first FB line.

6. The method of claim 1, wherein the FB points are determined based on at least one seismic attribute, wherein the at least one seismic attribute comprises an earliest point of a negative seismic signal wave, a local minimum of a seismic signal wave, an earliest point of a positive seismic signal wave, and a local maximum of the seismic signal wave.

7. A non-transitory computer-readable medium storing instructions which, when executed, cause a computer to perform operations comprising:

selecting, by a hardware processor, potential first-break (PFB) points based on seismic data obtained by plurality of seismic receivers in a geological location;

generating, by the hardware processor, a first plurality of first-break (FB) lines based on the PFB points, wherein the each of the first plurality of FB lines is determined by using a random sample consensus (RANSAC) algorithm;

selecting, by the hardware processor, a first FB line among the plurality of FB lines;

filtering, by the hardware processor, the PFB points based on the first FB line;

generating, by the hardware processor, a second plurality of FB lines based on the filtered PFB points;

selecting, by the hardware processor, a second FB line among the second plurality of FB lines; and determining, by the hardware processor, FB points based on the second FB line.

8. The non-transitory computer-readable medium of claim 7, wherein the seismic data comprises a plurality of traces, and a plurality of PFB points are selected for each trace of seismic data.

9. The non-transitory computer-readable medium of claim 7, wherein the first plurality of FB lines is generated based on slopes of the FB lines.

10. The non-transitory computer-readable medium of claim 7, wherein the first plurality of FB lines is generated based on energies of PFB points of the FB lines.

11. The non-transitory computer-readable medium of claim 7, wherein the PFB points are filtered by comparing arrival times of the PFB points with the first FB line.

12. The non-transitory computer-readable medium of claim 7, wherein the FB points are determined based on at least one seismic attribute, wherein the at least one seismic attribute comprises an earliest point of a negative seismic signal wave, a local minimum of a seismic signal wave, an earliest point of a positive seismic signal wave, and a local maximum of the seismic signal wave.

13. A device, comprising:

at least one hardware processor; and a non-transitory computer-readable storage medium coupled to the at least one hardware processor and storing programming instructions for execution by the at least one hardware processor, wherein the programming instructions, when executed, cause the at least one hardware processor to perform operations comprising:

selecting potential first-break (PFB) points based on seismic data obtained by plurality of seismic receivers in a geological location;

generating a first plurality of first-break (FB) lines based on the PFB points, wherein the each of the first plurality of FB lines is determined by using a random sample consensus (RANSAC) algorithm;

selecting a first FB line among the plurality of FB lines;

filtering the PFB points based on the first FB line;

generating a second plurality of FB lines based on the filtered PFB points;

selecting a second FB line among the second plurality of FB lines; and determining FB points based on the second FB line.

14. The device of claim 13, wherein the seismic data comprises a plurality of traces, and a plurality of PFB points are selected for each trace of seismic data.

15. The device of claim 13, wherein the first plurality of FB lines is generated based on slopes of the FB lines.

16. The device of claim 13, wherein the first plurality of FB lines is generated based on energies of PFB points of the FB lines.

17. The device of claim 13, wherein the PFB points are filtered by comparing arrival times of the PFB points with the first FB line.

* * * * *

UNITED STATES PATENT AND TRADEMARK OFFICE
CERTIFICATE OF CORRECTION

PATENT NO. : 10,921,472 B2  
APPLICATION NO. : 15/928323  
DATED : February 16, 2021  
INVENTOR(S) : Jewoo Yoo and Roald van Borselen Page 1 of 1

It is certified that error appears in the above-identified patent and that said Letters Patent is hereby corrected as shown below:

On the Title Page

Item (54) and in the Specification, in Column 1, Line 1, (Title), please replace "DETERMING" with -- DETERMINING --

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*